United States Patent [19]

Cunningham et al.

[11] Patent Number: 5,245,560
[45] Date of Patent: Sep. 14, 1993

[54] SEQUENCE DETECTION METHOD

[75] Inventors: Kathy L. Cunningham, Huntsville; Thomas L. Ballard, III, Madison; William B. Waldron, Jr., Huntsville, all of Ala.

[73] Assignee: Universal Data Systems, Inc., Huntsville, Ala.

[21] Appl. No.: 965,105

[22] Filed: Oct. 22, 1992

[51] Int. Cl.⁵ ............................................. G06F 7/00
[52] U.S. Cl. ............................................. 364/715.11
[58] Field of Search ................ 364/715.11; 340/146.2; 375/94

[56] References Cited

U.S. PATENT DOCUMENTS 3,801,956  4/1974  Braun et al. .................. 364/715.11
3,855,576  12/1974 Braun et al. .................. 364/715.11
4,166,271  8/1979  Thirlwall et al. ........... 364/715.11 X
4,404,542  9/1983  Thomas, Jr. .................... 340/146.2

Primary Examiner—Tan V. Mai
Attorney, Agent, or Firm—Wayne J. Egan

[57] ABSTRACT

A secure modem (151) sequence detector (101) may be programmed to detect the presence of various predetermined sequences in a bit stream (103). When detecting an escape ("ESC") sequence, the detector performs a fast pre-qualifying test to detect the presence of an ESC sequence. When an ESC sequence is detected, a second validation/placement routine is executed which validates the ESC sequence, and determines the bit position in the ESC sequence where the ESC sequence was detected. The second routine requires only a half-ESC sequence search for validation and placement. The detector may also be programmed to detect a start of message ("SOM") sequence.

30 Claims, 4 Drawing Sheets

SEQUENCE DETECTION METHOD

FIELD OF THE INVENTION

This application relates to secure modems including, but not limited to, a method for detecting the occurrence of a predetermined sequence in a bit stream.

BACKGROUND OF THE INVENTION

It is known for modems to detect various predetermined sequences during secure modem traffic. For example, an escape (hereinafter "ESC") sequence in accordance with the National Security Agency FSVS-210 rev. F pattern, for example, is a unique 128 dibit sequence, each dibit comprising 2 bits which is presented in hex dibits below:

| 3332 | 0010 | 0120 | 1101 | 3210 | 1121 | 3110 | 3322 |
| --- | --- | --- | --- | --- | --- | --- | --- |
| 0130 | 1021 | 2311 | 2331 | 2031 | 0232 | 3212 | 1111 |
| 3330 | 0020 | 0300 | 2203 | 3020 | 2303 | 2221 | 3310 |
| 0320 | 2103 | 1223 | 1323 | 0122 | 1131 | 3030 | 2223 |

This sequence is transmitted by a high speed modem during secure communications to indicate a transition from secure data to signalling data. An ESC detect algorithm requires an exact match of any 12 consecutive dibits to the ideal ESC sequence.

One prior ESC algorithm performs a straight sequence match, that is, it compares the latest 12 dibits of received data to a table containing the ideal ESC sequence. However, this first method requires that the sequence match be performed every dibit; this is an extremely slow method. It also requires that 2 look-up tables be kept; one for 2400/4800 baud rates, and one for 9600 baud rate.

A second algorithm is slightly more complicated, but somewhat faster. It uses the fact that the ESC sequence is a pseudo-random sequence, in which a cluster of 4 consecutive dibits of the sequence is not repeated anywhere else within the sequence. The hex number formed by the 4 dibit cluster is then used as an offset into a table, which contains values indicating the remaining number of dibits in the sequence from each specific 4 dibit cluster. An ESC is determined to be present by 3 consecutively-received clusters having a spacing of 4 between them. However, this second method adds to a cluster each baud (shifts in a dibit), and then performs the table look-up and calculations every baud. Although the every-baud-cluster building process is fast, the code executed every fourth baud is time-consuming and requires two large tables.

DESCRIPTION OF THE PREFERRED EMBODIMENT

Figure 1:
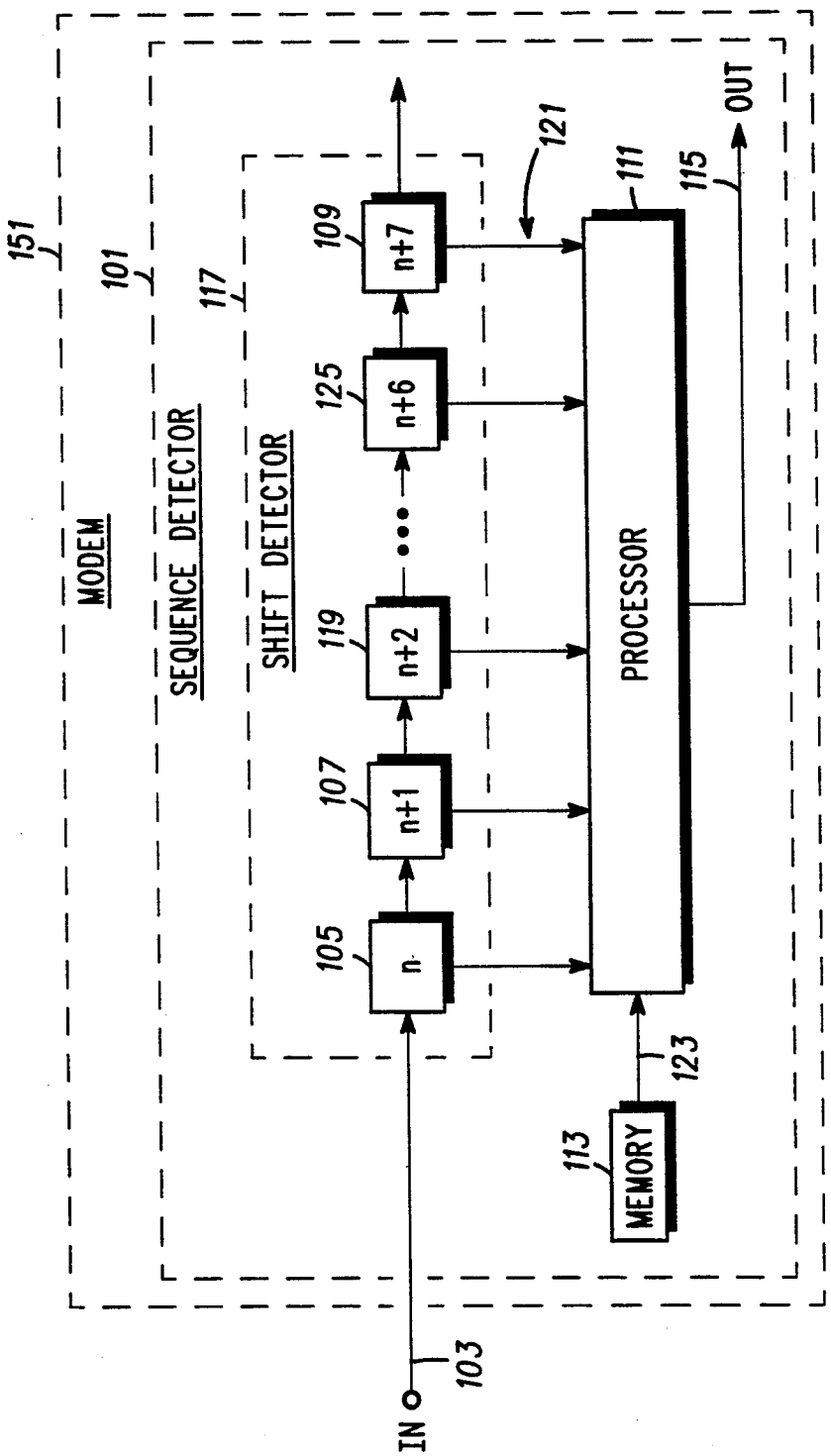
FIG. 1 is a block diagram that shows a modem suitable for demonstrating a sequence detection method, in accordance with the present invention.

FIG. 1 shows a modem 151 including a sequence detector 101. The sequence detector 101 includes a shift register 117, a memory device 113 and a processor 111 which may comprise, for example, a digital signal processor (hereinafter "DSP").

As shown, the modem receives a bit stream 103 and stores the bit stream in the shift register 117. The shift register 117, in turn, arranges the bit stream into contiguous groups of bits, the groups designated sequentially 1, 2, 3, ..., and each group containing a predetermined number of bits (k). For example, the predetermined number of bits (k) may equal 8; thus, k=8. In FIG. 1, several groups are depicted as follows: group n (designated 105), group n+1 (designated 107), group n+2 (designated 119), group n+6 (designated 125) and group n+7 (designated 109).

As shown, the processor 111 is arranged to selectively access the bits stored in the shift register 117 by means of a multiplicity of channels 121. Further, the processor is coupled to the memory device 113 by means of the channel 123. The memory device contains whatever stored software code, information, and data is necessary to program the processor 111 in order to cause the sequence detector 101 to detect the presence of an ESC sequence in the bit stream 103. The memory unit 113 may include, for example, a copy of the aforementioned ESC sequence in accordance with the National Security Agency FSVS-210 rev. F sequence. When an ESC sequence is successfully detected, the processor presents the results on lead 115.

Figure 2:
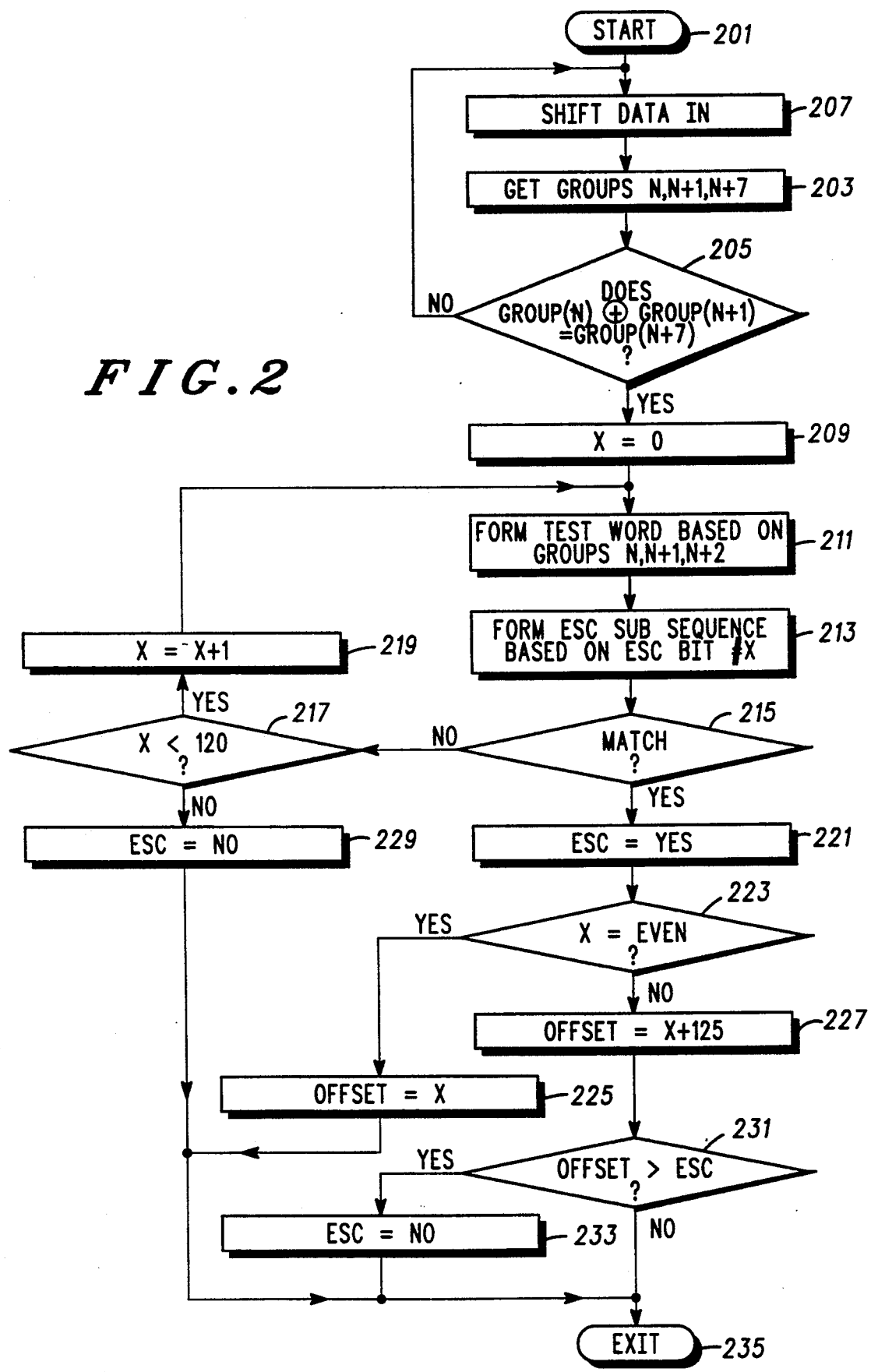
FIG. 2 is a first flow diagram for FIG. 1.

Referring to FIG. 2, there is shown a first flow diagram for the sequence detector 101.

The process begins, step 201, and then proceeds to step 207. In step 207, a further bit of the bit stream 103 is shifted into the shift register 117, where the bit stream is arranged into groups of k (thus 8) bits each designated 1, 2, 3, ..., including the groups n, n+1, n+2, and n+7.

In step 203, the process accesses groups n, n+1, and n+7 and, in step 205, determines whether the bits comprising group n, when exclusive OR'ed with the bits comprising group n+1, equal the bits comprising group n+7. If the answer is negative, the process returns to step 207. Thus, the process loops through steps 207, 203, and 205 until the result from step 205 is positive, whereupon the process goes to step 209.

In step 209, the parameter X is set to zero (0). The process next goes to step 211, where it forms a test word based on the bits in groups n, n+1, and n+2, the test word containing 3k (thus 24) bits.

In step 213, the process forms a 3k (thus 24)-bit ESC sub-sequence based on 3k (thus 24) continuous bits of the ESC sequence, beginning with the bit position defined by the parameter X. For the first pass through the process of FIG. 2, X=0, and thus the process forms a 24-bit ESC sub-sequence based on the first 24 bits of the ESC sequence.

In step 215, the process determines whether the test word formed in step 211 matches the ESC sub-sequence formed in step 213. If a match occurs, the determination from step 215 is positive and the process goes to step 221. If a match does not occur, the determination from step 215 is negative, and the process goes to step 217.

In step 221, the process determines that the ESC sequence is present in the bit stream. The process then goes to step 223, where it determines whether the current value of the parameter X is even.

If X is even, the process goes to step 225; but if X is odd, the process goes to step 227. For even X, step 225 determines the offset of the ESC sequence with respect to the first bit of group n is offset by a number of bits equal to X.

For the first pass through the process of FIG. 2, X=0, an even number, and thus step 225 will indicate a zero (0) offset for the ESC sequence with respect to the first bit of group n. In other words, step 225 will determine that the first bit of the ESC sequence is coincident with the first bit of group n. For subsequent passes through the process, however, X≠0, and thus for X even, step 225 will determine that the first bit of the ESC sequence is coincident with the first bit of group n, offset by X bits.

Returning to step 223, if X is odd, the process goes to step 227. Here the process determines the offset of the ESC sequence with respect to the first bit of group n is offset by a number of bits equal to X+128.

In step 231, the process determines whether the numerical value of the offset parameter computed by step 227 exceeds a first numerical limit, equal to 232. If so, an error condition exists, and step 233 determines that, notwithstanding the contrary affirmative result in step 221, no ESC sequence is present in the bit stream 103.

Returning to step 215, if no match exists, then the determination from step 215 is negative, and the process goes to step 217. Step 217 determines whether a second numerical limit, equal to 120, exceeds the present value of the parameter X. If so, step 229 determines that no ESC sequence is present in the bit stream 103. Otherwise, the parameter X is incremented in step 219, and the process returns to step 213.

It will be apparent to one skilled in the art that the processor 111 in FIG. 1 could readily be programmed based on the flow diagram in FIG. 2 in order to enable the sequence detector 101 to detect the presence of an ESC sequence in the bit stream 103, in accordance with the present invention. It will further be apparent to one skilled in the art that, while the embodiment described above utilized a value of k=8, other values of k are equally possible such as, for example, k=7, 9, etc.

Thus, a sequence detection method, in accordance with the present invention, performs a fast pre-qualifying test to detect the presence of an ESC sequence. When a sequence is detected, a second routine is executed which requires a half sequence search for match validation and placement.

The method may be understood by observing that the ESC sequence is based on an exclusive or (EOR) function seeded by seven (7) 1's, such that:

| | |
|---|---|
| bit 1 (1) EOR bit 2 (1) = | bit 8 (0) |
| bit 2 (1) EOR bit 3 (1) = | bit 9 (0) |
| bit 3 (1) EOR bit 4 (1) = | bit 10 (0) |
| . | |
| . | |
| bit 249 (1) EOR bit 250 (0) = | bit 256 (1) |

At bit 127, this function causes the sequence to repeat itself, such that the second half of the sequence (dibits 65-128) are identical to the first half of the sequence (dibits 1-64), shifted one bit (half a dibit) to the left. The (n) EOR (n+1)=(n+7) relationship can be extended to include dibits and larger groupings, and will hold on any bit boundary. The pre-qualifying test uses this relationship to detect the presence of an ESC sequence.

Thus, each baud, the modem 151 receives a dibit (2 bits) of the sequence. During 9600 baud operation, 4 bits are actually received, but two of these are padding (01) which is stripped out, leaving only the potential sequence dibit. Each received dibit is shifted into a temporary buffer, until 4 dibits have been collected, forming an 8 bit group. The group is stored into (n+7) of an 8 location modulo buffer. The group in location (n) is EOR'ed with the group in location (n+1). The result is compared to the newest group in location (n+7). If there is no match, the pointer to location (n) is incremented, and the process is repeated. As long as there is no match, this pre-qualifying routine is the only code that is executed. When a match occurs, this indicates that an ESC sequence is being received, and the validation/placement routine is executed.

The validation/placement routine confirms a match of 12 consecutive dibits, and places where in the ESC sequence the match has occurred. The validation segment builds a 24-bit word made up of groups (n), (n+1), (n+2), and compares it to the stored ideal ESC sequence, starting at the beginning of the ESC sequence, and shifting through the sequence, one bit at a time, until a match occurs. A search through only one-half of the ESC sequence is necessary, since the second half of the ESC sequence is identical to the first half, shifted left 1-bit (half of a dibit). By counting the number of shifts required to match to the ideal ESC sequence, it can be determined whether the match was in the first half of the sequence (even count) or second half (odd count), as well as the offset, or number of dibits into the appropriate half of the sequence. If no match is found, then there was not a valid 12-dibit match, and the process returns to executing the pre-qualifying test, without losing any data.

The method thus detects the presence of an ESC sequence by recognizing a logical relationship in the received data stream.

When compared to prior art techniques, a sequence detection method, in accordance with the present invention, is thus superior in that it requires that a table look-up occur only when an ESC sequence is detected by the pre-qualifying test, whereas the prior techniques required a table look-up at least every fourth baud. Further, a sequence detection method, in accordance with the present invention, requires a single look-up table of half the ESC sequence, whereas the prior methods required two (2) tables containing the entire ESC sequence for 2400/4800 baud and 9600 baud rates.

Moreover, a sequence detection method, in accordance with the present invention, allows the sequence detection function, which was previously implemented in a separate processor, to be implemented into a real time data pump, employing a single DSP unit, thereby allowing the host modem to react immediately, when required, upon the reception of an ESC sequence. Moreover, by taking full advantage of the teachings of a sequence detection method, in accordance with the present invention, it is possible to implement a sequence detector that is faster than the comparable prior art product, whilst using less memory than the comparable prior art product. A further advantage is that the sequence detector, in accordance with the present invention, does not lose data upon a false ESC detect, as compared to the comparable prior art product, which did.

Figure 3:
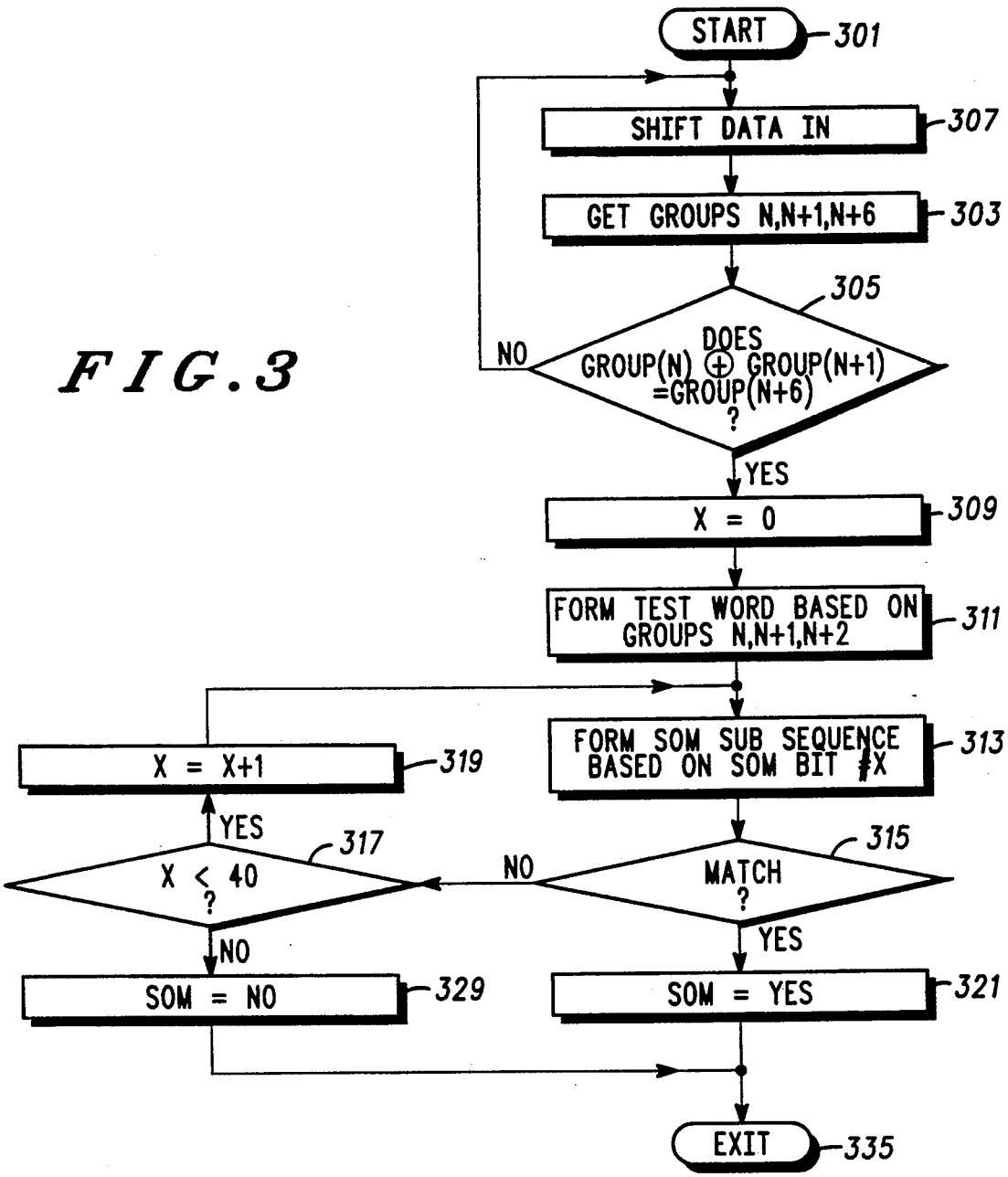
FIG. 3 is a second flow diagram for FIG. 1.

Referring to FIG. 3, there is shown a second flow diagram that may be used to program the sequence detector 101 to detect the presence of a start of message (hereinafter "SOM") sequence in the bit stream 103. In accordance with the National Security Agency FSVS-210 rev. F pattern, the SOM sequence is a unique 32 dibit sequence, each dibit comprising 2 bits which is presented in hex dibits below:

| 1332 | 0020 | 1202 | 2132 | 2032 | 1023 | 1312 | 1222 |
|------|------|------|------|------|------|------|------|

The memory unit 113 in this case will include a copy of the SOM sequence.

The process begins, step 301, and then proceeds to step 307. In step 307, a further bit of the bit stream 103 is shifted into the shift register 117, where the bit stream is arranged into groups of 8 bits each (assuming k=8) designated 1, 2, 3, ..., including the groups n, n+1, n+2, and n+6.

In step 303, the process accesses groups n, n+1, and n+6 and, in step 305, determines whether the bits comprising group n, when exclusive OR'ed with the bits comprising group n+1, equal the bits comprising group n+6. If the answer is negative, the process returns to step 307. Thus, the process loops through steps 307, 303, and 305 until the result from step 305 is positive, whereupon the process goes to step 309.

In step 309, the parameter X is set to zero (0). The process next goes to step 311, where it forms a test word based on the bits in groups n, n+1, and n+2, the test word containing 3k (thus 24) bits.

In step 313, the process forms a 3k (thus 24)-bit SOM sub-sequence based on 3k (thus 24) continuous bits of the SOM sequence, beginning with the bit position defined by the parameter X. For the first pass through the process of FIG. 3, X=0, and thus the process forms a 24-bit SOM sub-sequence based on the first 24 bits of the SOM sequence.

In step 315, the process determines whether the test word formed in step 311 matches the SOM sub-sequence formed in step 313. If a match occurs, the determination from step 315 is positive and the process goes to step 321. If a match does not occur, the determination from step 315 is negative, and the process goes to step 317.

In step 321, the process determines that the SOM sequence is present in the bit stream. The process is then complete, step 335.

Returning to step 315, if no match exists, then the determination from step 315 is negative, and the process goes to step 317. Step 317 determines whether a numerical limit, equal to 40, exceeds the present value of the parameter X. If so, step 329 determines that the SOM sequence is not present in the bit stream 103. Otherwise, the parameter X is incremented in step 319, and the process returns to step 313. It will be apparent to one skilled in the art that, while the embodiment described above utilizes a value of k=8, other values of k are equally possible such as, for example, k=7, 9, etc.

Figure 4:
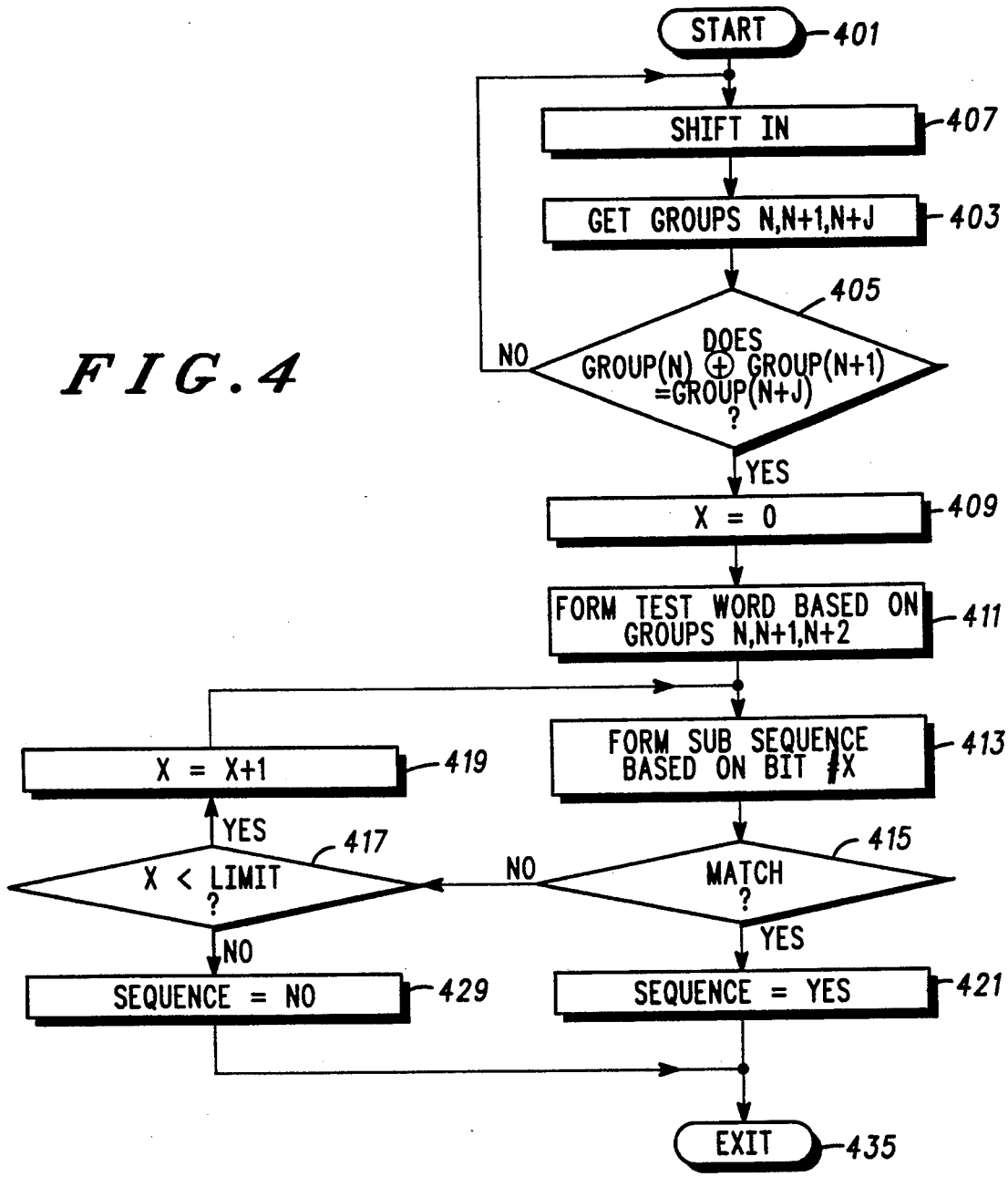
FIG. 4 is a third flow diagram for FIG. 1.

Referring to FIG. 4, there is shown a third flow diagram that may be used to program the sequence detector 101 to detect the presence of a predetermined sequence in the bit stream 103, the predetermined sequence generated by a scrambler of the type where n exclusive OR'ed with n+1 equals n+j, where j=2, 3, 4, .... Although the National Security Agency FSVS-210 rev.F document does not specify how the ESC and SOM sequences are generated, the ESC pattern may be generated with this type of scrambler, seeded with 1111111, with j=7; and the SOM pattern may be so generated, seeded with 011111, with j=6.

The process begins, step 401, and then proceeds to step 407. In step 407, a further bit of the bit stream 103 is shifted into the shift register 117, where the bit stream is arranged into groups of 8 bits each (assuming k=8) designated 1, 2, 3, ..., including the groups designated n, n+1 and n+j.

In step 403, the process accesses groups n, n+1, and n+j and, in step 405, determines whether the bits comprising group n, when exclusive OR'ed with the bits comprising group n+1, equal the bits comprising group n+j. If the answer is negative, the process returns to step 407. Thus, the process loops through steps 407, 403, and 405 until the result from step 405 is positive, whereupon the process goes to step 409.

In step 409, the parameter X is set to zero (0). The process next goes to step 411, where it forms a test word based on the bits in groups n, n+1, and n+2, the test word containing 3k (thus 24) bits.

In step 413, the process forms a 3k (thus 24)-bit sub-sequence based on 3k (thus 24) continuous bits of the predetermined sequence, beginning with the bit position defined by the parameter X. For the first pass through the process of FIG. 4, X=0, and thus the process forms a 24-bit sub-sequence based on the first 24 bits of the predetermined sequence.

In step 415, the process determines whether the test word formed in step 411 matches the sub-sequence formed in step 413. If a match occurs, the determination from step 415 is positive and the process goes to step 421. If a match does not occur, the determination from step 415 is negative, and the process goes to step 417.

In step 421, the process determines that the predetermined sequence is present in the bit stream. The process is then complete, step 435.

Returning to step 415, if no match exists, then the determination from step 415 is negative, and the process goes to step 417. Step 417 determines whether a predetermined numerical limit exceeds the present value of the parameter X. If so, step 429 determines that the predetermined sequence is not present in the bit stream 103. Otherwise, the parameter X is incremented in step 419, and the process returns to step 413.

It will be apparent to one skilled in the art that the numerical limit in step 417 may be chosen based on the predetermined sequence. It will further be apparent to one skilled in the art that, while the embodiment described above utilizes a value of k=8, other values of k are equally possible such as, for example, k=7, 9, etc.

In summary, the secure modem 151 sequence detector 101 may be programmed in accordance with the present invention to detect the presence of various predetermined sequences in the bit stream 103. When detecting an escape ("ESC") sequence, the detector performs a fast pre-qualifying test to detect the presence of an ESC sequence. When an ESC sequence is detected, a second validation/placement routine is executed which validates the ESC sequence, and determines the bit position in the ESC sequence where the ESC sequence was detected. The second routine requires only a half-ESC sequence search for validation and placement. The detector may also be programmed to detect a start of message ("SOM") sequence.

While various embodiments of a sequence detection method, in accordance with the present invention, have been described hereinabove, the scope of the invention is defined by the following claims.

What is claimed is:

1. In a sequence detector, the sequence detector having a shift register and having an input comprising a bit stream, a method for detecting the presence of an escape ("ESC") sequence in the bit stream, the ESC sequence being predetermined, the method comprising the steps of:

(a) receive and store the bit stream in the shift register;
(b) arrange the bit stream into contiguous groups of bits, the groups designated 1, 2, 3, ..., each group having k bits;
(c) select groups n, n+1, n+7; and,
(d) determine when the bits comprising group n exclusive OR'ed ("EOR") with the bits comprising group n+1 equal the bits comprising group n+7.

2. The method of claim 1 including the further steps of:
when the result of step (d) is positive:
(e) form a test word based on the bits in groups n, n+1 and n+2;
(f) form an ESC sub-sequence based on 3k contiguous bits of the ESC sequence beginning with the first bit thereof; and,
(g) determine when the test word matches the ESC sub-sequence.

3. The method of claim 2 including the further step of:
(h) when the result of step (g) is positive determine that the ESC sequence is present in the bit stream.

4. The method of claim 3 including the further step of:
(i) determine the first bit of the ESC sequence as being coincident with the first bit of group n.

5. The method of claim 4 including the further steps of:
when the result of step (g) is negative:
(j) form a new ESC sub-sequence based on 3k contiguous bits of the ESC sequence beginning with the next consecutive bit thereof, keeping track of the number of times (X) a new ESC sub-sequence is formed;
(k) determine when the ESC sub-sequence matches the test word; and,
(l) when no match is formed, then repeat steps (j) and (k).

6. The method of claim 5 including the further step of:
(m) when a match is determined in step (k), then determine that the ESC sequence is present in the bit stream.

7. The method of claim 6 including the further step of:
(n) determine whether X is even or odd.

8. The method of claim 7 including the further step of:
(o) when X is even, determine the first bit of the ESC sequence is coincident with the first bit of group n offset by X bits.

9. The method of claim 8 including the further step of:
(p) when X is odd, determine the first bit of the ESC sequence as being coincident with the first bit of group n offset by X+128 bits.

10. The method of claim 9 wherein k=8.

11. The method of claim 10 wherein the steps (a) through (p) are substantially performed by a digital signal processor, and the sequence detector comprises a modem.

12. The method of claim 11 wherein the ESC sequence is based on a predetermined sequence, said predetermined sequence being presented in hex dibits below:

| 3332 | 0010 | 0120 | 1101 | 3210 | 1121 | 3110 | 3322 |
| 0130 | 1021 | 2311 | 2331 | 2031 | 0232 | 3212 | 1111 |
| 3330 | 0020 | 0300 | 2203 | 3020 | 2303 | 2221 | 3310 |
| 0320 | 2103 | 1223 | 1323 | 0122 | 1131 | 3030 | 2223. |

13. In a sequence detector, the sequence detector having a shift register and having an input comprising a bit stream, a method for detecting the presence of a start of message ("SOM") sequence in the bit stream, the SOM sequence being predetermined, the method comprising the steps of:

(a) receive and store the bit stream in the shift register;
(b) arrange the bit stream into contiguous groups of bits, the groups designated 1, 2, 3, ..., each group having k bits;
(c) select groups n, n+1, n+6; and,
(d) determine when the bits comprising group n exclusive OR'ed ("EOR") with the bits comprising group n+1 equal the bits comprising group n+6.

14. The method of claim 13 including the further steps of:
when the result of step (d) is positive:
(e) form a test word based on the bits in groups n, n+1 and n+2;
(f) form an SOM sub-sequence based on 3k contiguous bits of the SOM sequence beginning with the first bit thereof; and,
(g) determine when the test word matches the SOM sub-sequence.

15. The method of claim 14 including the further step of:
(h) when the result of step (g) is positive determine that the SOM sequence is present in the bit stream.

16. The method of claim 15 including the further steps of:
when the result of step (g) is negative:
(j) form a new SOM sub-sequence based on 3k contiguous bits of the SOM sequence beginning with the next consecutive bit thereof, keeping track of the number of times (X) a new SOM sub-sequence is formed;
(k) determine when the SOM sub-sequence matches the test word; and,
(l) when no match is formed, then repeat steps (j) and (k).

17. The method of claim 16 including the further step of:
(m) when a match is determined in step (k), then determine that the SOM sequence is present in the bit stream.

18. The method of claim 17 wherein k=8.

19. The method of claim 18 wherein the steps (a) through (m) are substantially performed by a digital signal processor, and the sequence detector comprises a modem.

20. The method of claim 19 wherein the SOM sequence is based on a predetermined sequence, said predetermined sequence being presented in hex dibits below:

| 3332 | 0010 | 0120 | 1101 | 3210 | 1121 | 3110 | 3322 |
| 0130 | 1021 | 2311 | 2331 | 2031 | 0232 | 3212 | 1111 |
| 3330 | 0020 | 0300 | 2203 | 3020 | 2303 | 2221 | 3310 |

-continued

| 0320 | 2103 | 1223 | 1323 | 0122 | 1131 | 3030 | 2223. |

21. In a sequence detector, the sequence detector having a shift register and having an input comprising a bit stream, a method for detecting the presence of a predetermined sequence in the bit stream, the method comprising the steps of:
  (a) receive and store the bit stream in the shift register;
  (b) arrange the bit stream into contiguous groups of bits, the groups designated 1, 2, 3, . . . , each group having k bits;
  (c) select groups n, n+1, n+j; and,
  (d) determine when the bits comprising group n exclusive OR'ed ("EOR") with the bits comprising group n+1 equal the bits comprising group n+j; where j is an integer whose value is equal to or greater than 2.

22. The method of claim 21 including the further steps of:
  when the result of step (d) is positive:
  (e) form a test word based on the bits in groups n, n+1 and n+2;
  (f) form an sub-sequence based on 3k contiguous bits of the predetermined sequence beginning with the first bit thereof; and,
  (g) determine when the test word matches the sub-sequence.

23. The method of claim 22 including the further step of:
  (h) when the result of step (g) is positive determine that the predetermined sequence is present in the bit stream.

24. The method of claim 23 including the further steps of:
  when the result of step (g) is negative:
  (j) form a new sub-sequence based on 3k contiguous bits of the predetermined sequence beginning with the next consecutive bit thereof;
  (k) determine when the sub-sequence matches the test word; and,
  (l) when no match is formed, then repeat steps (j) and (k).

25. The method of claim 24 including the further step of:
  (m) when a match is determined in step (k), then determine that the predetermined sequence is present in the bit stream.

26. The method of claim 25 wherein k=8.

27. The method of claim 26 wherein the predetermined sequence is generated by a scrambler of the type where n exclusive OR'ed with n+1 equals n+j, where j=2, 3, 4, . . . .

28. The method of claim 27 wherein wherein the steps (a) through (m) are substantially performed by a digital signal processor, and the sequence detector comprises a modem.

29. The method of claim 28 wherein j=6.

30. The method of claim 28 wherein j=7.

* * * * *